(12) United States Patent
Shao (10) Patent No.: US 10,993,001 B2
(45) Date of Patent: *Apr. 27, 2021

(54) GAS METER FAULT PROMPTING SYSTEM OF COMPOUND INTERNET OF THINGS (IOT)

(71) Applicant: Chengdu Qinchuan IoT Technology Co., Ltd., Chengdu (CN)

(72) Inventor: Zehua Shao, Chengdu (CN)

(73) Assignee: Chengdu Qinchuan IoT Technology Co., Ltd., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,094

(22) Filed: Jan. 13, 2020

(65) Prior Publication Data
US 2020/0267458 A1    Aug. 20, 2020

Related U.S. Application Data

(63) Continuation of application No. 16/277,428, filed on Feb. 15, 2019, now Pat. No. 10,575,072.

(51) Int. Cl.
*H04Q 9/00* (2006.01)
*H04L 29/08* (2006.01)

(52) U.S. Cl.
CPC .............. *H04Q 9/00* (2013.01); *H04L 67/10* (2013.01); *H04L 67/12* (2013.01); *H04Q 2209/60* (2013.01); *H04Q 2209/86* (2013.01)

(58) Field of Classification Search
CPC .. H04Q 9/00; H04Q 2209/60; H04Q 2209/86; H04L 67/10; H04L 67/12
See application file for complete search history.

(56) References Cited

U.S. PATENT DOCUMENTS

| | | | | |
|---|---|---|---|---|
| 7,498,953 | B2 * | 3/2009 | Salser, Jr. | H04Q 9/00 340/870.02 |
| 2011/0309820 | A1 * | 12/2011 | Khanke | G01R 35/04 324/74 |
| 2013/0049764 | A1 * | 2/2013 | Koliwad | G01R 31/086 324/522 |
| 2013/0262654 | A1 * | 10/2013 | Masli | G06Q 50/06 709/224 |
| 2017/0063566 | A1 * | 3/2017 | Seminario | H04L 63/029 |

* cited by examiner

*Primary Examiner* — Mohamed Barakat
(74) *Attorney, Agent, or Firm* — Getech Law LLC; Jun Ye (57) ABSTRACT

The present invention provides a gas meter fault prompting method and Internet of Things (IoT) system based on a compound IoT, and relates to the field of an IoT. Each of object sub-platforms is configured to check its own operation state information in real time for a fault; a management platform is configured to inquire a fault type and a fault solution according to the operation state information and preset fault inquiry table, and send the fault type and solution to a corresponding user sub-platform via the service platform to display, so that a user can know and view the fault type and solution of a gas meter at the user sub-platform in a timely manner and thus may repair some simple faults of the gas meter independently; and therefore, the time cost and the labor cost are saved.

11 Claims, 4 Drawing Sheets

GAS METER FAULT PROMPTING SYSTEM OF COMPOUND INTERNET OF THINGS (IOT)

CROSS-REFERENCE TO RELATED APPLICATION

This application is a continuation of U.S. patent application Ser. No. 16/277,428, filed Feb. 15, 2019, the content of which application is hereby expressly incorporated herein by reference in its entirety.

TECHNICAL FIELD

The present invention relates to the field of an Internet of Things (IoT), and in particular to a gas meter fault prompting method and IoT system based on a compound IoT.

BACKGROUND

A fuel for daily cooking of people has been transformed from a conventional energy with serious resource waste and serious pollution, such as firewood and coal, into a clean energy such as natural gas, coal gas or even electricity. However, concerning the use of fuel gas, a fault may occur in a gas meter due to reasons such as external magnetic interference and insufficient battery capacity. For a user without repair experience, when some simple faults occur, he/she still needs to make a call to invite a maintainer of a gas company to the site for repair. As a result, a lot of labor costs and time costs are wasted, and the efficiency is low.

SUMMARY OF INVENTION

In view of this, an objective of the present invention is to provide a gas meter fault prompting method and IoT system based on a compound IoT.

According to a first aspect, the present invention provides a gas meter fault prompting method based on a compound IoT, which is applied to a gas meter fault prompting IoT system based on the compound IoT; the gas meter fault prompting IoT system based on the compound IoT includes a plurality of user sub-platforms, a service platform, a management platform, a plurality of sensor network sub-platforms and a plurality of object sub-platforms; each of the object sub-platforms includes a gas meter; and the gas meter fault prompting method based on the compound IoT includes:

checking, by each of the gas meters, own operation state information in real time for a fault;

if the fault occurs in a gas meter itself, sending, by the gas meter, operation state information to the management platform via a corresponding sensor network sub-platform;

inquiring, by the management platform, the fault type and solution according to the operation state information and preset fault inquiry table;

sending, by the management platform, the fault type and solution to the service platform; and sending, by the service platform, the fault type and solution to a corresponding user sub-platform to display.

According to a second aspect, the present invention further provides a gas meter fault prompting IoT system based on a compound IoT, which includes a plurality of user sub-platforms, a service platform, a management platform, a plurality of sensor network sub-platforms and a plurality of object sub-platforms; the plurality of user sub-platforms, the service platform, the management platform, the plurality of sensor network sub-platforms and the plurality of object sub-platforms are communicatively connected in sequence; and each of the object sub-platforms includes a gas meter;

each of the gas meters is configured to check its own operation state information in real time for a fault;

if the fault occurs in a gas meter itself, the gas meter is further configured to send the operation state information to the management platform via a corresponding sensor network sub-platform;

the management platform is configured to inquire the fault type and solution according to the operation state information and preset fault inquiry table;

the management platform is further configured to send the fault type and solution to the service platform; and the service platform is configured to send the fault type and solution to a corresponding user sub-platform to display.

Compared with the prior art, according to the gas meter fault prompting method and IoT system based on the compound IoT, each of the object sub-platforms is configured to check the own operation state information in real time for a fault; the management platform is configured to inquire the fault type and solution according to the operation state information and preset fault inquiry table, and send the fault type and solution to the corresponding user sub-platform via the service platform to display, so that a user can know and view the fault type and solution of the gas meter at the user sub-platform in a timely manner and thus may repair some simple faults of the gas meter independently; the invitation for a person of a gas company to the site for handling turns out to be unnecessary; and therefore, the time cost and the labor cost are saved.

To make the above objectives, characteristics and advantages of the present invention more apparent and understandable, preferred embodiments are set forth hereinafter and are described below in detail in combination with accompanying drawings.

BRIEF DESCRIPTION OF DRAWINGS

To make the objectives, technical solutions and advantages of the embodiments of the present invention clearer, a clear and complete description of the technical solutions in the present invention will be given below in combination with the accompanying drawings in the embodiments of the present invention. Apparently, the embodiments described below are a part, but not all, of the embodiments of the present invention. Generally, a component, described and illustrated in the accompanying drawings, in the embodiments of the present invention may be disposed and designed in various different configurations. Therefore, the following detailed description concerning the embodiments of the present invention and provided in the accompanying drawings is not intended to limit a claimed scope of the present invention, but merely represents selected embodiments of the present invention. All of the other embodiments, obtained by a person of ordinary skill in the art based on the embodiments of the present invention without any inventive efforts, fall into the protection scope of the present invention.

NUMERALS IN THE DRAWINGS

100—object sub-platform; 200—sensor network sub-platform; 300—management platform; 400—service platform; 500—user sub-platform.

DETAILED DESCRIPTION

A clear and complete description of the technical solutions in the present invention will be given below in combination with the accompanying drawings in the embodiments of the present invention. Apparently, the embodiments described below are a part, but not all, of the embodiments of the present invention. Generally, a component, described and illustrated in the accompanying drawings, in the embodiments of the present invention may be disposed and designed in various different configurations. Therefore, the following detailed description concerning the embodiments of the present invention and provided in the accompanying drawings is not intended to limit a claimed scope of the present invention, but merely represents selected embodiments of the present invention. All of the other embodiments, obtained by those skilled in the art based on the embodiments of the present invention without any inventive efforts, fall into the protection scope of the present invention.

Figure 1:
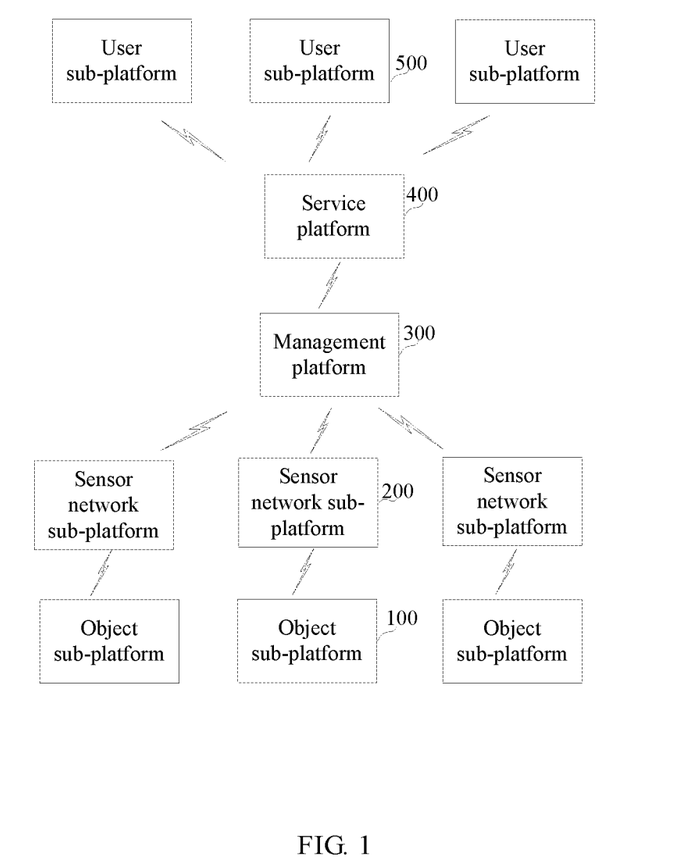
FIG. 1 illustrates an interactive schematic diagram of a gas meter fault prompting IoT system based on a compound IoT provided by an embodiment of the present invention.
Figure 2:
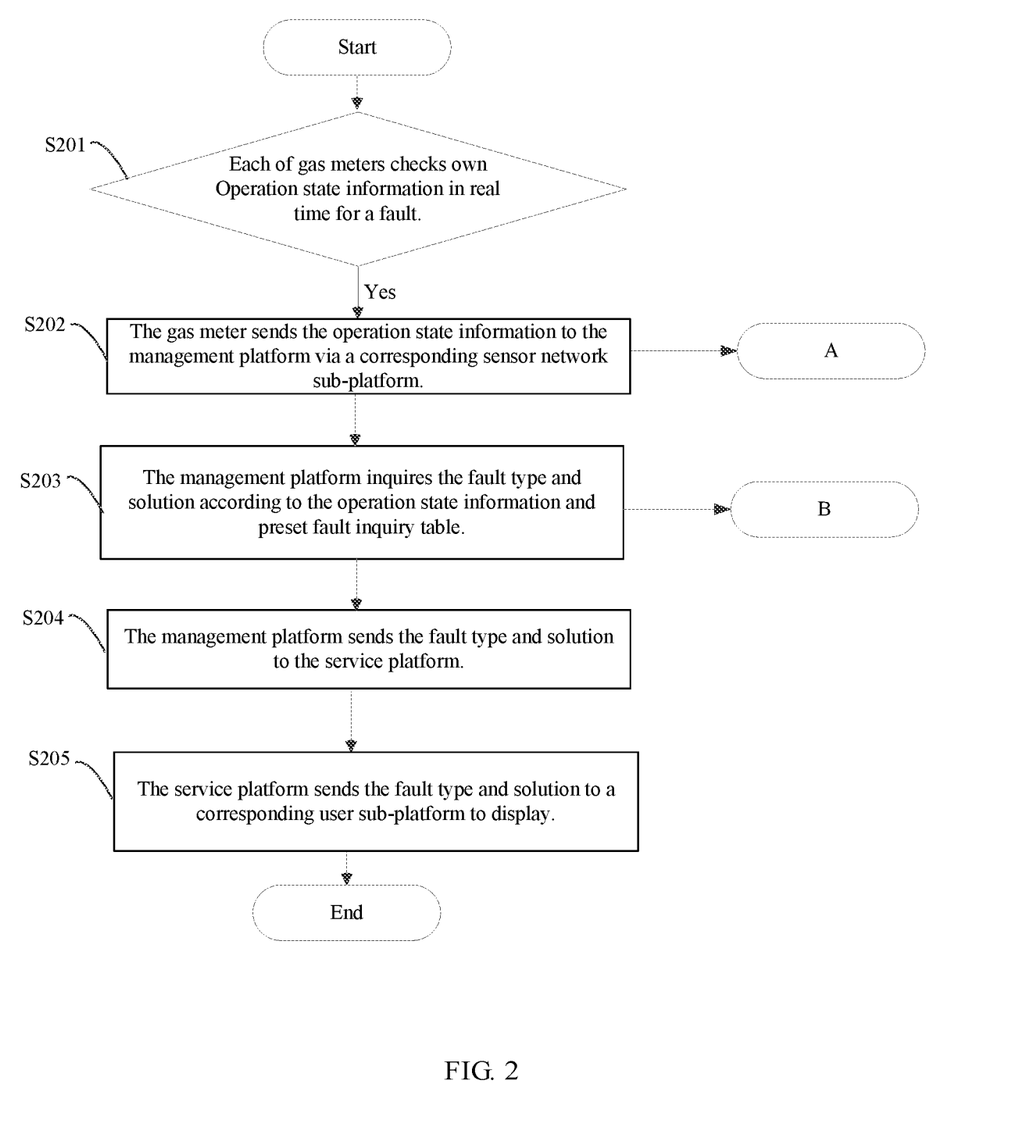
FIG. 2, FIG. 3 and FIG. 4 illustrate flowcharts of a gas meter fault prompting method based on a compound IoT provided by an embodiment of the present invention.

Referring to FIG. 1, an embodiment of the present invention provides a gas meter fault prompting method based on a compound IoT, which is applied to a gas meter fault prompting IoT system based on the compound IoT. The gas meter fault prompting IoT system based on the compound IoT includes a plurality of user sub-platforms 500, a service platform 400, a management platform 300, a plurality of sensor network sub-platforms 200 and a plurality of object sub-platforms 100. Herein, any one of the plurality of object sub-platforms 100 may be communicatively connected with the management platform 300 via any one or more of the plurality of sensor network sub-platforms 200, so as to send data of the object sub-platform 100 to the management platform 300, or receive a signal sent by the management platform 300. The management platform 300 is communicatively connected with the service platform 400. In this embodiment, the service platform 400 may include at least one of a gas company service platform 400, a government service platform 400 or a social operator service platform 400. The service platform 400 is communicatively connected with the user sub-platforms 500, and is configured to receive information sent by the user sub-platforms 500 and forward the information to the management platform 300, as well as push information sent by the management platform 300 to the user sub-platforms 500. The management platform 300 and the service platform 400 each may be a server. Each of the object sub-platforms 100 includes a gas meter. As shown in FIG. 2, the gas meter fault prompting method based on the compound IoT may include the following steps.

Step S201: Each of gas meters checks own operation state information in real time for a fault, and in case of a fault, step S202 is executed.

Step S202: The gas meter sends the operation state information to the management platform 300 via a corresponding sensor network sub-platform 200.

In this embodiment, the plurality of sensor network sub-platforms 200 may be a plurality of different gateways, and each of the object sub-platforms 100 sends information to the management platform 300 via one or more gateways. The management platform 300 communicates with the gas meters via the sensor network sub-platforms 200 so as to receive operation state information in real time. Herein, the information can be sent once every 1 min, 5 min or 10 min, and preferably once every 1 min to the management platform 300.

Step S203: The management platform 300 inquires the fault type and solution according to the operation state information and preset fault inquiry table.

Specifically, for example, the fault type inquired by the management platform 300 according to the operation state information and preset fault inquiry table is that a battery capacity is insufficient, and the inquired fault solution is to replace a battery.

For another example, the fault type inquired by the management platform 300 according to the operation state information and preset fault inquiry table is that positive and negative electrodes of the battery of the gas meter are in poor contact, and the inquired fault solution is to clean the battery and wipe the aluminum sheet and spring in the battery box.

In addition, common fault types of the gas meter further include arrearage, gas leakage and the like, and the management platform 300 may inquire a solution respectively via the preset fault inquiry table, which will not be repeated herein.

Step S204: The management platform 300 sends the fault type and solution to the service platform 400.

Step S205: The service platform 400 sends the fault type and solution to a corresponding user sub-platform 500 to display.

In this embodiment, each of the user sub-platforms 500 may be a universal electronic device, such as a Personal Computer (PC), smartphone, tablet computer, Personal Digital Assistant (PDA), and Mobile Internet Device (MID). A user can look up the fault type and solution of the gas meter at the user sub-platform 500, and completes corresponding repair processing independently.

Figure 3:
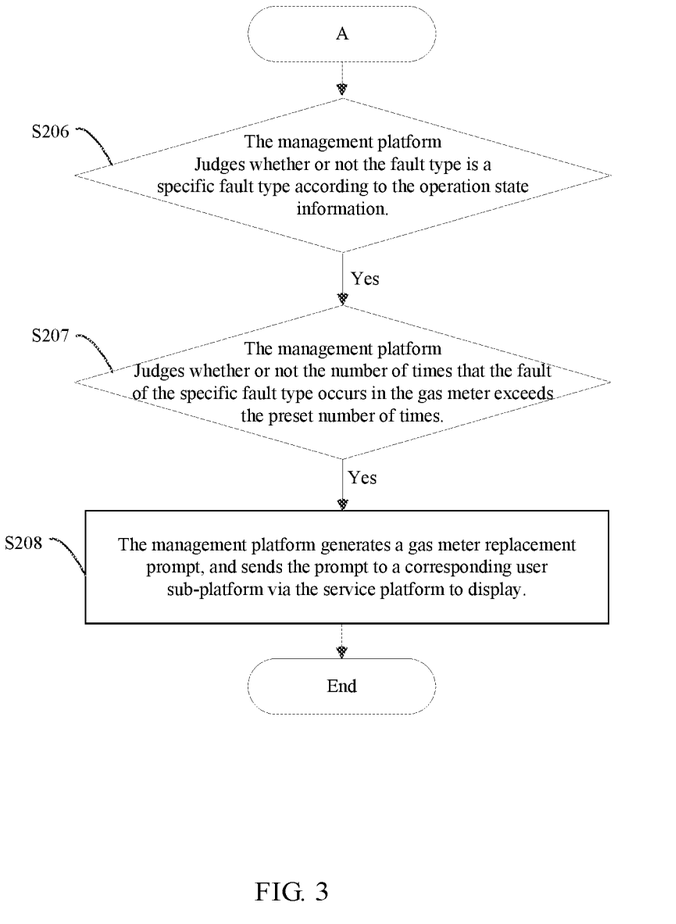

Besides, in this embodiment, if a specific fault type occurs for multiple times, such as gas leakage, and excessive gear abrasion, the gas meter cannot be used any more, and it is necessary to remind the user of replacing the gas meter. Therefore, as shown in FIG. 3, after step S203, the gas meter fault prompting method based on the compound IoT may further include the following steps.

Step S206: The management platform 300 judges whether or not the fault type is a specific fault type according to the operation state information, and if yes, step S207 is executed.

Step S207: The management platform 300 judges whether or not the number of times that the fault of the specific fault type occurs in the gas meter exceeds the preset number of times, and if yes, step S208 is executed.

The preset number of times varies due to different fault types, and the specific number of times is determined based on the fault type.

Step S208: The management platform 300 generates a gas meter replacement prompt, and sends the prompt to a corresponding user sub-platform 500 via the service platform 400 to display.

The user can look up the gas meter replacement prompt at the user sub-platform 500 and replace the gas meter independently.

Figure 4:
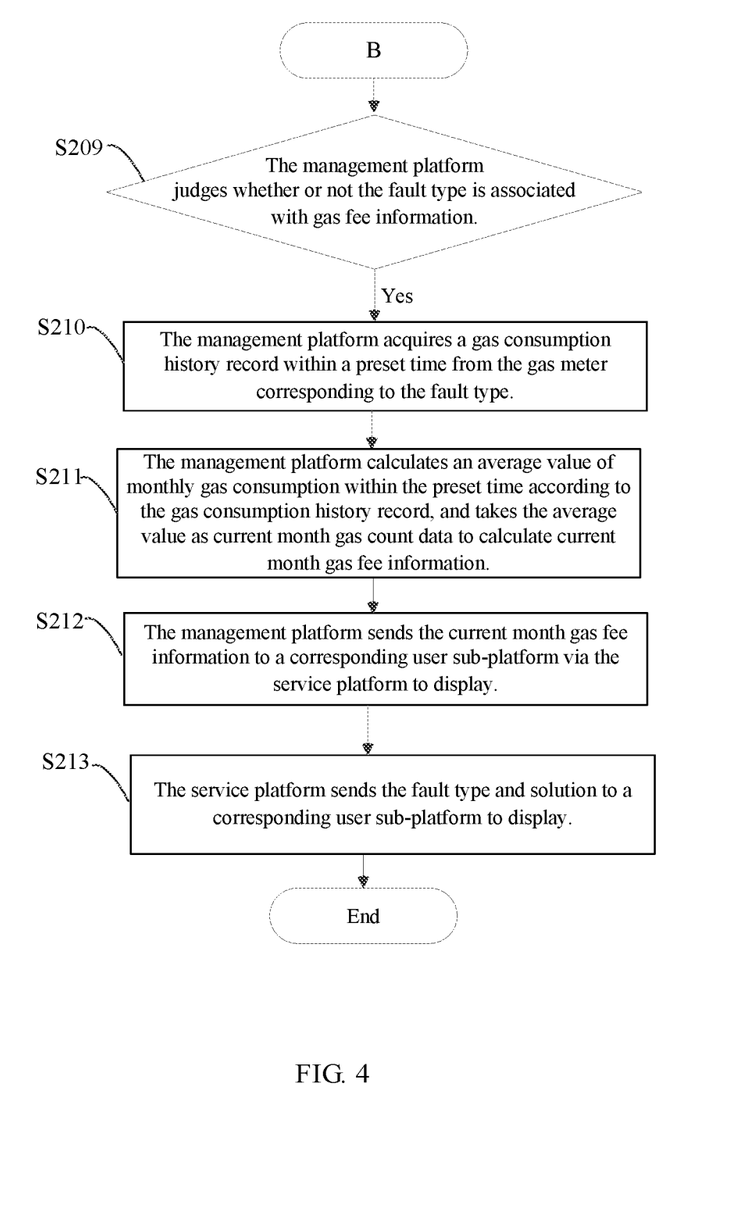

Additionally, in this embodiment, the fault type is associated with gas fee information and thus it is possible that the final calculated gas fee is unfair to the user, if the fault type is gas leakage or excessive gas injection or inaccurate counting. In this sense, the gas fee needs to be recalculated. Therefore, as shown in FIG. 4, after step S202, the gas meter fault prompting method based on the compound IoT may further include the following steps.

Step S209: The management platform 300 judges whether or not the fault type is associated with gas fee information, and if yes, step S210 is executed.

Step S210: The management platform 300 acquires a gas consumption history record within a preset time from the gas meter corresponding to the fault type.

Step S211: The management platform 300 calculates an average value of monthly gas consumption within the preset time according to the gas consumption history record, and takes the average value as current month gas count data to calculate current month gas fee information.

In this embodiment, the fault type is associated with the gas fee information, which refers to that gas count data in the last month mismatches with gas data used by the user in the current month due to the fault of the gas meter, e.g., the count of the gas meter is excessively large and is in inconformity with an actual use condition due to the gas leakage, so in order that gas data in the month when the fault occurs in the gas meter is in conformity with the actual use condition approximately, the average value of monthly gas consumption is taken as the current month gas count data. For example, if the current month is July, the average value of monthly gas consumption in the first half year (i.e., January to June) is calculated, and the average value is taken as the current month gas count data, thereby being relatively reasonable.

Step S212: The management platform 300 sends the current month gas fee information to a corresponding user sub-platform 500 via the service platform 400 to display.

Referring to FIG. 1, an embodiment of the present invention further provides a gas meter fault prompting IoT system based on a compound IoT. It is to be noted that for the gas meter fault prompting IoT system based on the compound IoT provided by this embodiment of the present invention, the basic principles and generated technical effects are the same as the those of the foregoing embodiment. In order to describe briefly, parts not mentioned in this embodiment of the present invention may be referred to corresponding contents in the above embodiment. The gas meter fault prompting IoT system based on the compound IoT includes a plurality of user sub-platforms 500, a service platform 400, a management platform 300, a plurality of sensor network sub-platforms 200 and a plurality of object sub-platforms 100; the plurality of user sub-platforms 500, the service platform 400, the management platform 300, the plurality of sensor network sub-platforms 200 and the plurality of object sub-platforms 100 are communicatively connected in sequence; and each of the object sub-platforms 100 includes a gas meter.

Each of the gas meters is configured to check own operation state information in real time for a fault.

If the fault occurs in a gas meter itself, the gas meter is further configured to send the operation state information to the management platform 300 via a corresponding sensor network sub-platform 200.

The management platform 300 is configured to inquire the fault type and solution according to the operation state information and preset fault inquiry table.

Specifically, for example, the fault type inquired by the management platform 300 according to the operation state information and preset fault inquiry table is that a battery capacity is insufficient, and the inquired fault solution is to replace a battery. For another example, the fault type inquired by the management platform 300 according to the operation state information and preset fault inquiry table is that positive and negative electrodes of the battery of the gas meter are in poor contact, and the inquired fault solution is to clean the battery and wipe the aluminum sheet and spring in the battery box.

The management platform 300 is further configured to send the fault type and solution to the service platform 400.

The service platform 400 is configured to send the fault type and solution to a corresponding user sub-platform 500 to display.

In addition, in this embodiment, the management platform 300 is further configured to judge whether or not the fault type is a specific fault type according to the operation state information.

If the fault type is the specific fault type, the management platform 300 is further configured to judge whether or not the number of times that the fault of the specific fault type occurs in the gas meter exceeds the preset number of times.

If the number of times that the fault of the specific fault type occurs in the gas meter exceeds the preset number of times, the management platform 300 is further configured to generate a gas meter replacement prompt, and send the prompt to a corresponding user sub-platform 500 via the service platform 400 to display.

Besides, in this embodiment, the management platform 300 is further configured to judge whether or not the fault type is associated with gas fee information.

If the fault type is associated with the gas fee information, the management platform 300 is further configured to acquire a gas consumption history record within a preset time from the gas meter corresponding to the fault type.

The management platform 300 is further configured to calculate an average value of monthly gas consumption within the preset time according to the gas consumption history record, and take the average value as current month gas count data to calculate current month gas fee information.

The management platform 300 is further configured to send the current month gas fee information to a corresponding user sub-platform 500 via the service platform 400 to display.

In conclusion, according to the gas meter fault prompting method and IoT system based on the compound IoT, each of the object sub-platforms is configured to check the own operation state information in real time for a fault; the management platform is configured to inquire the fault type and solution according to the operation state information and preset fault inquiry table, and send the fault type and solution to the corresponding user sub-platform via the service platform to display, so that the user can know and view the fault type and solution of the gas meter at the user sub-platform in a timely manner and thus may repair some simple faults of the gas meter independently; the invitation for a person of a gas company to the site for handling turns out to be unnecessary; and therefore, the time cost and the labor cost are saved.

In several embodiments provided by the present application, it should be understood that the disclosed apparatus and method may also be implemented in other manners. The described apparatus embodiments are merely exemplary. For example, the flowcharts and block diagrams in the drawings illustrate the system architecture, function, and operation of possible implementations of apparatuses, methods, and computer program products according to various embodiments of the present invention. In this regard, each block in the flowcharts or block diagrams may represent a module, program segment, or portion of code, which includes one or more executable instructions for implementing the specified logical function(s). It should also be noted that in some alternative implementation manners, the functions noted in the block may occur out of the sequence noted in the drawings. For example, two continuous blocks, in fact, may be executed concurrently, or in a reverse order, which will depend upon the functions involved. It will also be noted that each block of the block diagrams and/or flowcharts, and combinations of blocks in the block diagrams and/or flowcharts, may be implemented by a special hardware-based IoT system that performs the specified functions or acts, or by using combinations of special hardware and computer instructions.

In addition, each module in the embodiments of the present invention may exist independently, and two or more modules may be integrated into an independent part.

When a function is implemented in the form of the software functional unit and sold or used as a separate product, the function may be stored in a computer readable storage medium. Based on such understanding, the technical solutions of the present invention or the part that makes contributions to the prior art or a part of the technical solutions may be substantially embodied in a form of a software product. The computer software product is stored in a storage medium, and includes several instructions to instruct a computer device (which may be a personal computer, server, network device, or the like) to execute all or some steps of the methods described in the embodiments of the present invention. The foregoing storage medium includes: various media capable of storing a program code, such as a disk, a mobile hard disk, a Read-Only Memory (ROM), a Random Access Memory (RAM), a magnetic disk or an optical disk. It should also be noted that, in the description, such relation terms as first and second are merely used for distinguishing one entity or operation from the other entity or operation, rather than requiring or hinting that these entities or operations have any practical relation or sequence. Moreover, the terms "comprise", "include" or any other variant are intended to cover non-exclusive inclusion, so that the processes, methods, articles or devices including a series of factors not only include those factors, but also include other factors listed implicitly, or further include inherent factors of the processes, methods, articles or devices. In the absence of more limitations, the factors defined by the statement "include one . . . " do not exclude other identical factors in the processes, methods, articles or devices including said factors.

The above are merely preferred embodiments of the present invention, and are not intended to limit the present invention. A person skilled in the art may make various modifications and changes to the present invention. Any modification, equivalent replacement, improvement and the like made within the spirit and principle of the present invention all shall be included in a scope of protection of the present invention. It should be noted that similar reference numerals and letters refer to similar items in the following drawings, and thus once an item is defined in one drawing, it does not need to be further defined and explained in the subsequent drawings.

The foregoing descriptions are merely specific implementation manners of the present invention, but are not intended to limit a scope of protection of the present invention. Any variation or replacement readily figured out by a person skilled in the art within the technical scope disclosed in the present invention shall fall within the scope of protection of the present invention. Therefore, the scope of protection of the present invention shall be subject to the scope of protection of the claims.

It should also be noted that, in the description, such relation terms as first and second are merely used for distinguishing one entity or operation from the other entity or operation, rather than requiring or hinting that these entities or operations have any practical relation or sequence. Moreover, the terms "comprise", "include" or any other variant are intended to cover non-exclusive inclusion, so that the processes, methods, articles or devices including a series of factors not only include those factors, but also include other factors listed implicitly, or further include inherent factors of the processes, methods, articles or devices. In the absence of more limitations, the factors defined by the statement "include one . . . " do not exclude other identical factors in the processes, methods, articles or devices including said factors.

What is claimed is:

1. A gas meter fault prompting method for a gas meter fault prompting IoT system of compound Internet of Things (IoT), wherein the gas meter fault prompting IoT system comprises a plurality of user sub-platforms, a service platform, a management platform, a plurality of sensor network sub-platforms and a plurality of object sub-platforms; each of the object sub-platforms comprises a gas meter; and the gas meter fault prompting method comprises:

checking, by each of the gas meters, own operation state information in real time for a fault;

determining that the fault occurs in a gas meter itself, sending, based on a determination that the fault occurs in the gas meter itself by the gas meter, operation state information to the management platform via a corresponding sensor network sub-platform;

determining, by the management platform, whether the fault type is a specific fault type according to the operation state information;

based on a determination that the fault type is the specific fault type, further determining, by the management platform, whether or not the number of times that the fault of the specific fault type occurs in the gas meter exceeds the preset number of times; and based on a determination that the number of times that the fault of the specific fault type occurs in the gas meter exceeds the preset number of times, generating, by the management platform, a gas meter replacement prompt, and sending the prompt to a corresponding user sub-platform via the service platform to display, inquiring, by the management platform, the fault type and solution according to the operation state information and preset fault inquiry table;

sending, by the management platform, the fault type and solution to the service platform; and sending, by the service platform, the fault type and solution to a corresponding user sub-platform to display.

2. The gas meter fault prompting method based on the compound IoT according to claim 1, wherein after the step of inquiring, by the management platform, the fault type and solution according to the operation state information and preset fault inquiry table, the gas meter fault prompting method based on the compound IoT further comprises:

judging, by the management platform, whether or not the fault type is associated with gas fee information;

if the fault type is associated with the gas fee information, acquiring, by the management platform, a gas consumption history record within a preset time from the gas meter corresponding to the fault type;

calculating, by the management platform, an average value of monthly gas consumption within the preset time according to the gas consumption history record, and taking the average value as current month gas count data to calculate current month gas fee information; and sending, by the management platform, the current month gas fee information to a corresponding user sub-platform via the service platform to display.

3. The gas meter fault prompting method based on the compound IoT according to claim 1, wherein the fault type inquired by the management platform according to the operation state information and preset fault inquiry table is that a battery capacity is insufficient, and the inquired fault solution is to replace a battery.

4. The gas meter fault prompting method based on the compound IoT according to claim 1, wherein the fault type inquired by the management platform according to the operation state information and preset fault inquiry table is that positive and negative electrodes of a battery of the gas meter are in poor contact, and the inquired fault solution is to clean the battery and wipe a aluminum sheet and a spring in the battery box.

5. A gas meter fault prompting system of a compound Internet of Things (IoT), comprising a plurality of user sub-platforms, a service platform, a management platform, a plurality of sensor network sub-platforms and a plurality of object sub-platforms, wherein the plurality of user sub-platforms, the service platform, the management platform, the plurality of sensor network sub-platforms and the plurality of object sub-platforms are communicatively connected in sequence; and each of the object sub-platforms comprises a gas meter;

each of the gas meters is configured to check its own operation state information in real time for a fault;

based on a determination that the fault occurs in a gas meter itself, the gas meter is further configured to send the operation state information to the management platform via a corresponding sensor network sub-platform;

wherein the management platform is configured to determine whether the fault type is a specific fault type according to the operation state information, wherein, based on a determination that the fault type is the specific fault type, the management platform is further configured to determine whether or not the number of times that the fault of the specific fault type occurs in the gas meter exceeds the preset number of times, wherein, based on a determination that the number of times that the fault of the specific fault type occurs in the gas meter exceeds the preset number of times, the management platform is further configured to generate a gas meter replacement prompt, and send the prompt to a corresponding user sub-platform via the service platform to display, the management platform is configured to inquire the fault type and solution according to the operation state information and preset fault inquiry table;

the management platform is further configured to send the fault type and solution to the service platform; and the service platform is configured to send the fault type and solution to a corresponding user sub-platform to display.

6. The gas meter fault prompting system according to claim 5, wherein the management platform judges whether or not the fault type is associated with gas fee information;

based on the determination that the fault type is associated with the gas fee information, the management platform is further configured to acquire a gas consumption history record within a preset time from the gas meter corresponding to the fault type;

the management platform is further configured to calculate an average value of monthly gas consumption within the preset time according to the gas consumption history record, and take the average value as current month gas count data to calculate current month gas fee information; and the management platform is further configured to send the current month gas fee information to a corresponding user sub-platform via the service platform to display.

7. The gas meter fault prompting system according to claim 5, wherein the fault type inquired by the management platform according to the operation state information and preset fault inquiry table is that a battery capacity is insufficient, and the inquired fault solution is to replace a battery.

8. The gas meter fault prompting system according to claim 5, wherein the fault type inquired by the management platform according to the operation state information and preset fault inquiry table is that positive and negative electrodes of a battery of the gas meter are in poor contact, and the inquired fault solution is to clean the battery and wipe a aluminum sheet and a spring in the battery box.

9. A gas meter fault prompting method for a gas meter fault prompting IoT system of compound IoT, wherein the gas meter fault prompting IoT system comprises a plurality of user sub-platforms, a service platform, a management platform, a plurality of sensor network sub-platforms and a plurality of object sub-platforms; each of the object sub-platforms comprises a gas meter; and the gas meter fault prompting method comprises:

checking, by each of the gas meters, own operation state information in real time for a fault;

determining that the fault occurs in a gas meter itself, sending, based on a determination that the fault occurs in the gas meter itself by the gas meter, operation state information to the management platform via a corresponding sensor network sub-platform;

inquiring, by the management platform, the fault type and solution according to the operation state information and preset fault inquiry table;

determining, by the management platform, that the fault type is associated with gas fee information;

based on a determination that the fault type is associated with the gas fee information, acquiring, by the management platform, a gas consumption history record within a preset time from the gas meter corresponding to the fault type;

calculating, by the management platform, an average value of monthly gas consumption within the preset time according to the gas consumption history record, and taking the average value as current month gas count data to calculate current month gas fee information;

sending, by the management platform, the current month gas fee information to a corresponding user sub-platform via the service platform to display;

sending, by the management platform, the fault type and solution to the service platform; and sending, by the service platform, the fault type and solution to a corresponding user sub-platform to display.

10. The gas meter fault prompting method according to claim 9, wherein the fault type inquired by the management platform according to the operation state information and preset fault inquiry table is that a battery capacity is insufficient, and the inquired fault solution is to replace the battery.

11. The gas meter fault prompting method according to claim 9, wherein the fault type inquired by the management platform according to the operation state information and preset fault inquiry table is that positive and negative electrodes of a battery of the gas meter are in poor contact, and the inquired fault solution is to clean the battery and wipe a aluminum sheet and a spring in the battery box.

* * * * *